April 21, 1964

J. P. WADLECK 3,129,639

ROLL GROOVE MILLING MACHINE

Filed June 22, 1961

INVENTOR.
JOSEPH P. WADLECK
BY
Bosworth, Sessions
Herrstrom & Knowles
ATTORNEYS

April 21, 1964 J. P. WADLECK 3,129,639
ROLL GROOVE MILLING MACHINE
Filed June 22, 1961 4 Sheets-Sheet 2

INVENTOR.
JOSEPH P. WADLECK
BY Bosworth, Sessions
Herrstrom & Knowles
ATTORNEYS

April 21, 1964   J. P. WADLECK   3,129,639
ROLL GROOVE MILLING MACHINE
Filed June 22, 1961   4 Sheets-Sheet 3

INVENTOR.
JOSEPH P. WADLECK
BY Bosworth, Sessions
Herrstrom & Knowles
ATTORNEYS

April 21, 1964     J. P. WADLECK     3,129,639
ROLL GROOVE MILLING MACHINE

Filed June 22, 1961                                  4 Sheets-Sheet 4

INVENTOR.
JOSEPH P. WADLECK
BY
Bosworth, Sessions,
Herrstrom & Knowles
ATTORNEYS

United States Patent Office 3,129,639
Patented Apr. 21, 1964

3,129,639
ROLL GROOVE MILLING MACHINE
Joseph P. Wadleck, Ellwood City, Pa., assignor to Blaw-Knox Company, Pittsburgh, Pa., a corporation of Delaware
Filed June 22, 1961, Ser. No. 118,976
11 Claims. (Cl. 90—11)

This invention relates to a method and apparatus for machining rolls, and more particularly to a method and apparatus for machining grooves in mill rolls. While the invention may be advantageously used for various purposes, it provides exceptional benefits when employed in machining the grooves in mill rolls used for stretch-reducing tubes or the like.

The grooves of such mill rolls must be periodically machined to dress or otherwise reshape them so that the rolls can function effectively and accurately. Heretofore, the usual practice has involved removing the rolls from the mill roll housing, mounting the rolls individually in a lathe, machining the rolls, remounting the rolls in the mill roll housing along with the other roll or rolls, and adjusting all the rolls in the housing relatively to each other and to the remainder of the apparatus. This involves large amounts of time and labor, difficulties in accurately machining the grooves in the separated rolls so the grooves will properly match as to location and shape when the rolls are assembled, problems in properly adjusting the rolls in the roll housing, and, for these reasons, lengthy down time of tube mill in which the rolls are employed, with corresponding production losses and added costs.

Prior attempts have been made to overcome these difficulties by machining the roll grooves while the rolls are mounted in the mill roll housing; in such attempts, the rolls have been rotatated at relatively high peripheral speeds against a mushroom type cutter mounted to achieve lathe-type cutting action. Apparatus designed to operate in this manner has not been as effective as is desirable, because the machining operation is slow since the tool must be fed slowly to prevent overheating from the large amount of heat developed at the single cutting edge, because unequal wear of the single cutting edge of the cutting tool results in undesirable variations in the contours of the grooves, and since the bearings supporting the mill rolls in the mill roll housing may be subjected to undesirably large forces.

Furthermore, difficulties arise in rolling with rolls machined by any process involving lathe-type machining because the characteristic tool marks resulting from the cutting operation extend circumferentially of the roll groove surfaces in the direction of rolling. These circumferentially extending irregularities do not provide any gripping effect on the work being rolled, with the result that the work being rolled tends to slip in the roll grooves, particularly in stretch reducing mills.

An object of the invention is the provision of a method and apparatus for machining mill roll grooves which overcomes such disadvantages and difficulties of prior methods and apparatus. Another object is the provision of a mill roll machining method and apparatus in which the mill roll grooves may be machined without removing the mill rolls from the mill roll housing, by a circular milling cutter rotating at a relatively high machining speed about a suitably located axis, which may be coincident with the pass line of the mill rolls, while the mill rolls are slowly rotated. A further object of the invention is to provide such method and apparatus capable of machining in mill rolls grooves of a wide range of cross sectional shapes and sizes, including those which define a circular opening and those which define an oval opening between the mill rolls. Another object is the provision of such method and apparatus which is capable of rapidly and accurately machining the grooves in mill rolls of the desired shape and cross section with a minimum of down time of the mill. A further object is the provision of method and apparatus for machining mill rolls in which the surface irregularities caused by the machining operation extend transversely of the grooves, and thus aid the mill rolls in gripping the work and preventing slippage, even when the rolls are employed in stretch-reducing mills.

Other objects and advantages of the invention will be apparent from the following description of a preferred embodiment thereof, reference being made to the accompanying drawings in which.

Figure 1:
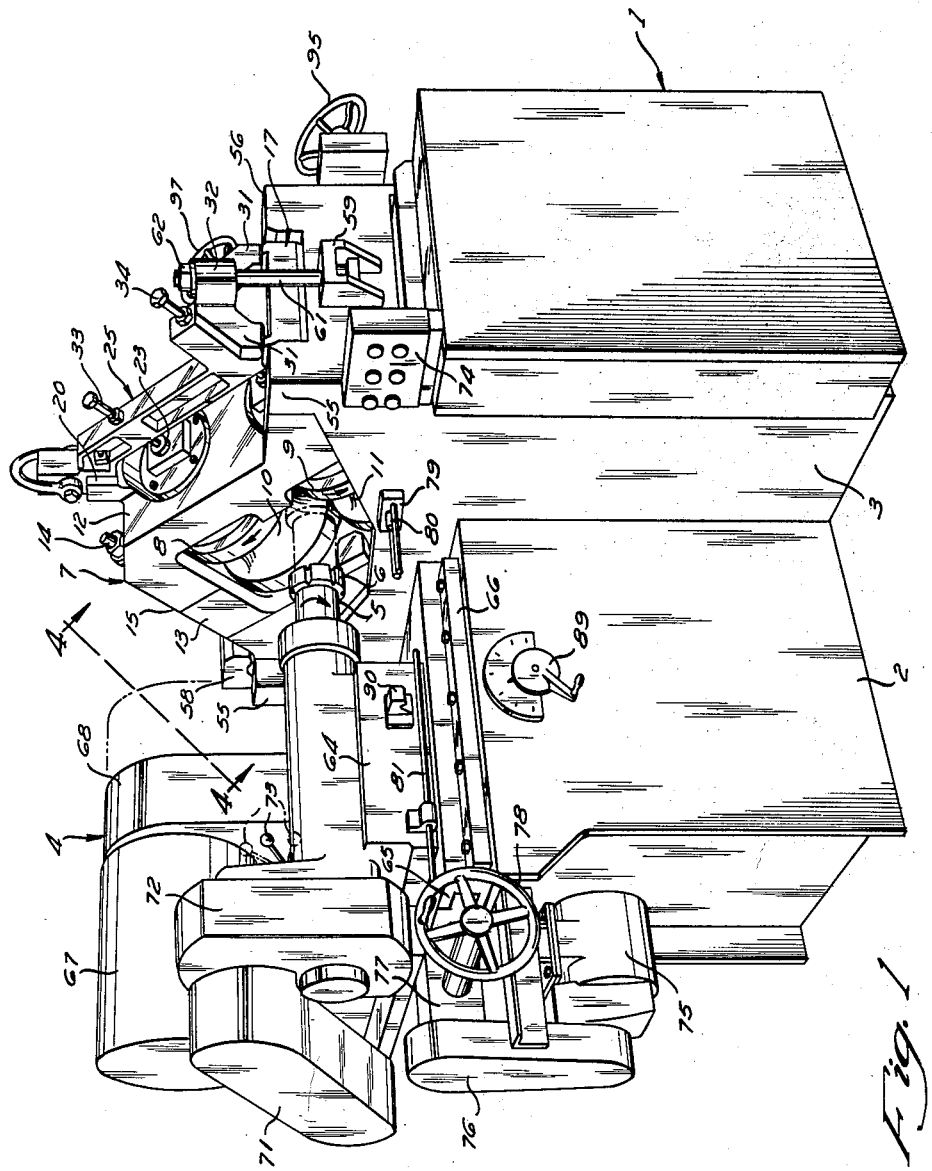
FIGURE 1 is a perspective elevation of a preferred form of apparatus embodying, and capable of operating according to, the invention. The view shows the side at which the operator works during the machining operation.

The apparatus illustrated as embodying the invention comprises a supporting base or frame 1 made up of base portions 2 and 3 disposed at right angles to each other in L-shaped relation when viewed from above. Portion 2 of the base slidably horizontally supports a carriage 4 in which is rotatably mounted a spindle 5 carrying a rotatable milling cutter 6. Portion 3 of the base is adapted rigidly and accurately to support a mill roll housing generally indicated by reference numeral 7 and shown to advantage in FIGURE 3. This housing rotatably supports the mill rolls 8 and 9 not only during the machining of the roll grooves 10 and 11, but also supports the rolls as they act on the work in the mill.

Figure 3:
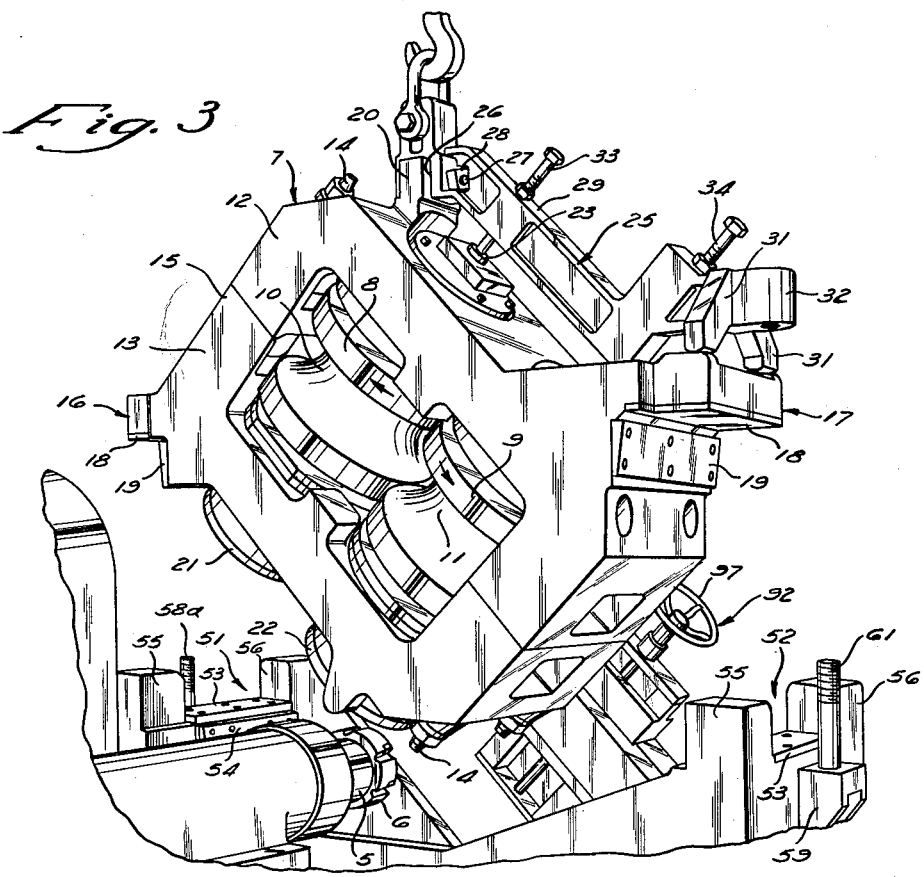
FIGURE 3 is a perspective of a portion of the apparatus, viewed generally from the direction of FIGURE 1, but to a somewhat larger scale than FIGURES 1 and 2, showing the mill roll housing carrying the mill rolls as it is about to be lowered into and mounted in the apparatus of the invention.

As apparent from FIGURE 3, the illustrated mill housing 7 comprises two rigid members 12 and 13 fixed together, as by bolts 14, to form a rigid, strong frame structure 15 in which are journalled the two mill rolls 8 and 9, the illustrated assembly being typical of those used in stretch-reducing mills. At two of its diagonally opposite corners, the mill housing frame 15 is provided in the usual manner with supporting means 16, 17 by which it is supported in a mill; each of these supporting means carries a plate member 18 of uniform thickness and a tapered member 19 of tapered cross section uniform longitudinally of the member. Members 18 and 19 are formed of hardened steel, and each pair of cooperating members 18 and 19 is so mounted on the mill housing frame 15 that their bearing faces are at an obtuse angle. A lifting lug 20 is also fixed to the mill housing frame 15 at a corner between the corners carrying the supporting means 16 and 17. In order to drive the mill rolls, coupling members 21 and 22 are fixed to the ends of the shafts 23 and 24 on which the mill rolls 8 and 9 are mounted, only the small diameter free ends of the shafts being shown in FIGURE 4. The illustrated coupling members 21 and 22 are those normally used to connect the mill rolls 8 and 9 to a source of power which positively rotates them in the mill. Other parts such as conventional lubricant and coolant conduits are not shown as they are unnecessary to an understanding of the present invention.

Figure 4:
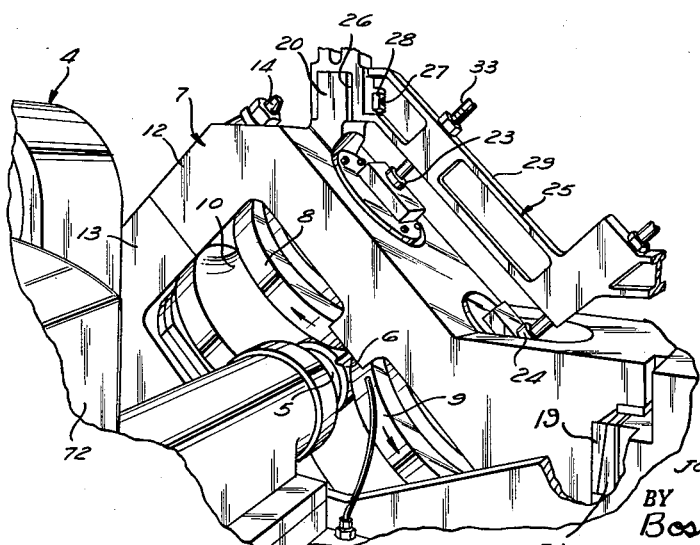
FIGURE 4 is a perspective to the scale of FIGURE 3 of a portion of the apparatus of the invention as viewed generally from line 4—4 of FIGURE 1, showing the rotating cutter in the act of machining the grooves in the mill rolls in the mill roll housing mounted in the apparatus.

As shown in FIGURES 3 and 4, the mill housing frame 15 has temporarily fixed to it an auxiliary supporting member 25 which performs the functions, among others, of supporting the mill housing subassembly while it is being lowered into and lifted out of the machining apparatus, aiding in clamping the subassembly into the apparatus of the invention, and forming part of means for exerting forces on the mill rolls to prevent axial movement during machining. The illustrated supporting member 25 is formed of forged or cast steel and at one end has a slotted portion 26 closely engaging the lifting lug 20; a bolt 27 passing through the slotted portion 26 of member 25 and the lug 20, and a nut 28 on the bolt, firmly secure the member 25 to frame 15. Member 25 also embodies an elongated portion 29 extending along the upper end of mill frame 15 and terminating in an end portion having downwardly extending lugs 31 contacting the mill frame 15, and also having a projecting threaded lug 32 which aids in holding the mill frame 15 in place in the apparatus as later described. Member 25 also has threaded therein two bolts 33 and 34, the ends of which bear against the ends of shafts 23 and 24 for reasons later described.

The mill roll housing frame 15 also temporarily carries means for preventing angular oscillation or vibration of the mill rolls during the machining operation in which the rotating cutter is used. Such means may be installed before the mill roll housing assembly is mounted in the machining apparatus, or after it has been so mounted but before machining with the rotating cutter; it is advantageously used during such machining operation, but is removed prior to machining of the edges of the mill grooves 10 and 11 with the non-rotatable auxiliary cutter to be later described.

Figure 5:
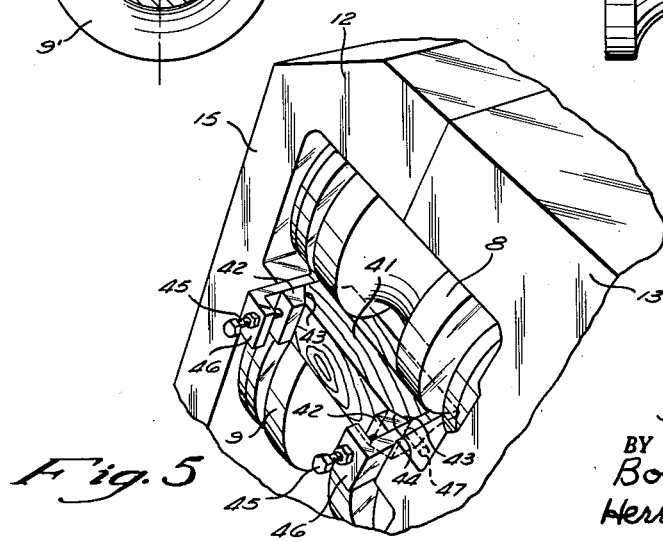
FIGURE 5 is a perspective, to the same scale as FIGURE 3, of the side of the mill roll housing and associated apparatus opposite that shown in FIGURE 4, illustrating the wedge means preferably employed to eliminate angular oscillation of the mill rolls during machining of the roll grooves with the rotating cutter.

The means illustrated for this purpose is shown to advantage in FIGURE 5 and comprises a wedge 41 that is substantially as long as the mill rolls and generally wedge shaped in cross section, having curving arcuate sides substantially matching the circular outer peripheries of the mill rolls. The wedge member is preferably formed of hardwood or other suitable material which can exert substantial pressure without scoring or otherwise damaging the rolls. The wedge is forced against the rolls 8 and 9 on the side opposite the cutter 6, by metal wedge blocks 42 at each end; each block 42 has a tapered surface 43 contacting a corresponding inclined surface 44 at the end of wedge 41, and is held in place and urged against the wedge by a stud 45 rotatably secured in the wedge block and threaded into a bracket 46 hooked over a pin 47 located in the corresponding side of the mill housing frame 15 near the bight of the mill rolls 8 and 9. The arrangement of the wedge 41, the two wedge blocks 42, and their brackets 46 is such that force exerted by the studs 45 on the wedge blocks 42 and transmitted through inclined surfaces 43 and 44 forces the wedge against the rolls 8 and 9 and also locates the wedge centrally of the rolls. The wedge 41 when installed and pressed against the rolls with sufficient pressure by adjustment of bolts 45, exerts a braking effect that prevents angular oscillations or vibrations of the rolls about their axes and also preloads the roll bearings in radial directions. The wedge thus prevents chattering, vibrations and the like which might otherwise arise due to play in the driving and coupling systems and bearings, and which would prevent accurate machining.

The means by which the mill housing 7 is accurately, firmly, and adjustably mounted in the apparatus of the invention is shown in FIGURES 1, 2, 3 and 4. The base portion 3 of the apparatus has two supporting portions 51 and 52 adapted to engage the supporting portions 16 and 17 of the housing frame 15. Each of portions 51 and 52 embodies a bearing plate 53 adapted to support bearing plate 18 of the mill housing; each also has a tapered plate 54 adapted to engage the generally upright tapered surfaces of one of plates 19 of the mill housing. By selection of plates 53 and 54 of suitable thickness, or by shimming, the mill housing 7 can be accurately located so that the pass line of the mill roll coincides with the axis of the rotatable cutter 6. Each supporting portion 51 and 52 also includes an upstanding shoulder portion 55 on the side nearest the cutting tool 6, and an upstanding shoulder portion 56 on the side remote from the cutting tool; both shoulder portions 56 have threaded studs 57 (FIGURE 2) which force lugs forming parts of supporting means 16 and 17 of frame 15 against shoulder portions 55 to firmly locate the frame 15 longitudinally of the axis of the cutter 6. If desired, suitable shims may also be inserted between portions 55 and adjacent portions of the frame 15 to aid in locating the frame axially of the cutter.

Figures 2, 6:
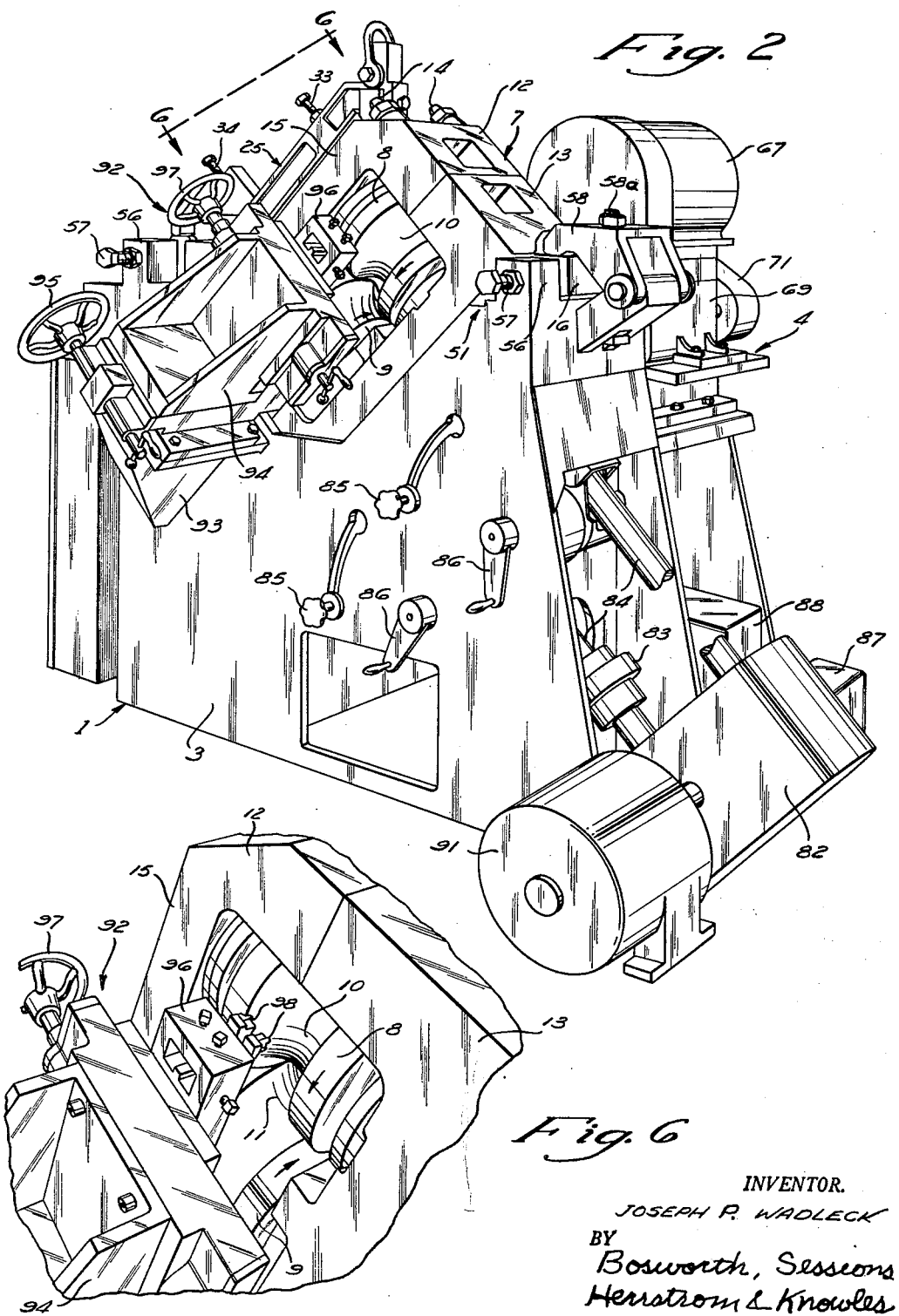
FIGURE 2 is a perspective elevation showing the apparatus of FIGURE 1 from the other side thereof.
FIGURE 6 is a perspective, to the same scale as FIGURE 3, of a portion of the apparatus, as viewed generally from line 6—6 of FIGURE 2, showing non-rotatable auxiliary cutting tools carried by the apparatus as used in trimming the outer edges of the mill roll grooves after they have been machined by the rotatable cutter.

Supporting portion 51 of the base of the apparatus pivotally supports a hinged clamping member 58 which is pressed downwardly on supporting means 16 of frame 15 by a clamping bolt 58a as shown in FIGURE 2. Supporting portion 52 of the base carries a bracket 59 supporting a bolt 61, see FIGURE 1. This bolt has a head at its lower end and a threaded upper end which passes through lug 32 of supporting member 25 and is provided with a hold down nut 62. Clamping member 58 and bolt 61 thus hold the frame 15 firmly in the position in which it is located transversely and axially of the axis of cutting tool 6 as described above. These members 58 and 61 can be easily and rapidly disengaged to release the mill roll housing subassembly for removal.

The carriage 4 that carries the tool spindle 5 comprises a lower body portion 64 slidably mounted in guideways 65 formed in a base 66 bolted to the top of base portion 2 of the apparatus. Body portion 64 also supports an electric motor 67 driving the spindle through a belt drive contained in housing 68, speed change mechanism 69 (see FIGURE 2), a belt drive contained in housing 71 (see FIGURES 1), and a speed reducing drive 72. The speed change mechanism 69 is of a conventional variable speed type, adjustable by control handle 73 (FIGURE 1) to provide any one of a wide range of speeds for the spindle. The motor 67 may be started and stopped from control box 74.

The illustrated apparatus also embodies means for rapidly advancing the carriage 4 to bring the cutting tool 6 to a predetermined position adjacent the mill rolls 8 and 9, and for rapidly retracting the carriage 4 away from the mill rolls to a position where the cutter 6 is clear of the rolls and the mill housing 7. Such means includes a reversible electric motor 75 supported from the body portion 64 of the carriage 4. This motor may be manually started, stopped and reversed from control box 74, through suitable circuit means not shown, and the motor, through suitable speed reducing and transmission means 76 operates conventional mechanism in housing 77 for effecting the desired rapid travel of the carriage 4. A conventional hand wheel 78 that can be engaged with and disengaged from the mechanism in housing 77 is also provided for moving the carriage 4. While the hand wheel can move the carriage the entire distance of travel, it is ordinarily used only for final adjustment and for feeding during the machining operation. The apparatus preferably is provided with automatic means, including stop means 79 on the base 1 and adjustable engaging means 81 on the carriage 4, for stopping the carriage when it reaches a predetermined location in its rapid travel toward the mill rolls. Such means, as well as the drive means between motor 67 and spindle 5, the rapid traversing means actuated by motor 75, and other control means are of conventional construction. Preferably, the stop means 79 on the base also is so designed that it removably supports a gage block 80 which can be contacted by lug 90 on carriage 4 to limit movement of cutter 6 between the rolls.

In order to rotate the mill rolls 8 and 9 during the machining operation, a gear box 82 is connected through universal joints 83 to the two mill roll drive shafts 84 (see FIGURE 2). The apparatus is so designed that the axes of shafts 84 lie in a plane common to the axes of the mill rolls 8 and 9 when the mill housing subassembly is mounted in the apparatus. Each of shafts 84 has suitable coupling means, not shown, adapted to engage the appropriate coupling member 21 or 22 of the mill housing subassembly. Such coupling means are movable toward the coupling members 21 and 22 and the shafts 84 are angularly movable in their common plane to engage the coupling means with the coupling members 21 and 22, by suitable adjustable means controlled by handles 85 and 86 shown in FIGURE 2. Since any one of several mechanisms can be used to connect shafts 84 with the coupling members 21 and 22, no further description is considered necessary.

During the machining operation by the tool 6, each of the mill rolls 8 and 9 is slowly rotated at a suitable speed in the directions indicated by the arrows in FIGURE 1 by a worm gear drive in gear box 87, the output of which is connected to gear box 82 and the input shaft of which is connected to variable speed transmission 88 driven by an electric motor not shown in the base portion 2. The mechanism 88 is of a conventional type which provides an infinitely variage speed of an output shaft, within a specified range. The apparatus is designed so that variable speed changer 88 can be controlled by handle 89 (FIGURE 1) to provide the desired low speed of rotation for milling rollers 8 and 9 during machining with the rotatable cutter 6. The rolls 8 and 9 are rotated so that their surfaces at the bite of the rolls travel toward the cutting end of cutter 6, as shown by the arrows in FIGURES 1, 2, 4, 7 and 9.

The illustrated apparatus also includes another drive motor 91 connected to gear box 82; motor 91 is only energized to drive the mill rolls 8 and 9 rapidly in the proper directions for the subsequent machining operation on the edges of the grooves, as will be described later. Preferably, there is a one-way drive clutch, not shown, between worm gear transmission 87 and gear box 82, so that the low speed drive which includes transmission 87 and speed changer 88 is capable of driving the gear box 82, but cannot be driven by the gear box when the motor 91 is actuated.

As shown in FIGURES 2 and 6, the base portion 3 supports auxiliary machining means, generally indicated by reference character 92, on the side of the mill housing assembly 7 opposite the cutting tool 6. Means 92 is designed to trim the edges of the mill roll grooves 10 and 11 after completion of machining by the rotating cutting tool 6 and removal of the wedge member 41 and its associated supporting means. Such means 92 comprises a supporting member 93 rigidly fixed to the base portion 3 of the apparatus, and slidably supporting a carriage 94 for movement toward and away from the rolls 8 and 9. A hand wheel 95 and associated conventional mechanism are provided for thus moving member 94. Member 94 itself slidably supports a tool holder 96 for movement parallel to the plane containing the axes of the mill rolls 8 and 9 when they are mounted in the apparatus. Such supporting means is of conventional construction, as are the hand wheel 97 and associated mechanisms for effecting lateral movement of member 96. Tool holder 96 is adapted to support a pair of lathe-type cutting bits 98 in such manner so that each can be employed to machine one of the outer edges of the groove 10 in the upper roll 8. The tool holder 96 also carries another pair of cutting bits, not shown, for similarly machining the outer edges of the groove 11 in the lower roll 9. The tools are manipulated to do the desired cutting and trimming by hand wheels 95 and 97.

The operation of the illustrated apparatus is as follows, assuming that the mill housing subassembly has not yet been mounted in the machine. At this stage, the carriage 4 is retracted the maximum distance away from the position to be occupied by the mill housing, the pivotally mounted clamping member 58 is swung to its opened position, the couplings on shafts 84 are retracted and proper couplings are installed for the type of mill housing assembly to be used, and the auxiliary machining carriage 94 is fully retracted away from the position occupied by the mill housing subassembly.

The mill housing 7, to which the auxiliary supporting member 25 has been fixed by bolt 27 is then lifted into place, in the manner shown in FIGURE 3, so that its supporting means 16 and 17 are located in the supporting portion 51 and 52 of the base portion 3 of the apparatus, as previously described. Shims are used if necessary to locate subassembly 7 so the pass line of the rolls coincides with the axis about which spindle 5 and cutter 6 rotate. The mill housing is then locked into place in the proper location by clamping member 58, bolts 57, stud 61, and nut 62. The bolts 33 and 34 are then tightened against the ends of the shafts 23 and 24 of the mill rolls 8 and 9 to prevent any axial movement of the rolls during machining. The wedge member 41, together with wedge blocks 42, studs 45 and brackets 46 are installed, and the studs 45 tightened until the wedge member 41 bears firmly against the rolls 8 and 9 to apply radial loads to the roll neck bearings and to prevent angular oscillation or vibration of the rolls.

In accordance with a set-up chart, the proper rough machining cutter 6 of the end mill type is mounted on the spindle, the speed of speed change mechanism 69 is properly adjusted by control handle 73 for the type of cutter and size of mill rolls, and the roll drive motor speed is also adjusted by means of handle 89. The motor 67 is started and the rotating cutter 6 is rapidly advanced to a predetermined position adjacent the mill rolls 8 and 9, and then is manually advanced to provide the desired roughing cut, the proper gage block 80 having been selected to limit travel of the cutter. After the rough machining operation is finished, the carriage 4 is rapidly retracted by the power means indicated and the motor 67 is halted.

In accordance with the set-up chart, the speed of the rolls 8 and 9 is adjusted for finish machining by control member 89 and the motor is then halted. A different milling cutter of the end mill type 6 with the proper number and arrangement of teeth as specified in the set-up chart is mounted on the spindle for finish machining. The speed of the spindle 5 is properly adjusted by control handle 73, and the motor 67 is started. The carriage 4 is rapidly advanced to a predetermined position where it may be automatically halted and the motor driving the shafts 84 through speed reducer 88 is started.

The finish machining operation is carried out by manually feeding the rotating cutter 6 until it reaches the desired position, as will be described later, this position being determined by the properly selected gage block 80. After completion of the machining operation, the carriage 4 is rapidly retracted, the motor driving the rolls 8 and 9 is halted, and the spindle motor 67 is stopped.

In order to trim the outer edges of the resulting grooves, the wedge member 41 and associated parts are removed. The proper cutting tools 98 are selected and mounted in accordance with the set-up chart. The drive motor 91 is started and the cutting tools 98 are used to round off or otherwise trim the edges of the grooves 10 and 11 by manipulation of the controls 95 and 97. Thereafter, the tool holder 96 and slide member are fully retracted to the maximum distance away from the mill housing subassembly 7, the handles 85 and 86 are adjusted to disengage the couplings on shafts 84 from the coupling members 21 and 22, and the clamping member 57 and stud 61 are disengaged from the mill housing frame 15. The mill housing 7, containing the newly machined rolls is then ready to be lifted out of the apparatus by means of auxiliary supporting member 25, and to be reinstalled in the mill.

The cutter 6 may be any suitable milling cutter of the end mill type. Preferably, it is one having a plurality of front cutting edges adapted to cut in a plane generally perpendicular to the axis of rotation of the cutter, and also a plurality of outer cutting edges adapted to cut in a generally cylindrical surface facing and coaxial with the axis of rotation of the cutter. Best results are obtained if the outer cutting edges are slightly inclined toward the axis of the cutter from the front of the cutter, to provide a suitable rake angle as is shown, for example, by angle X in FIGURES 7 and 9. Desirably, the cutter is of the type having adjustable and readily replaceable hardened cutting blades, preferably of the throw-away type. The relative speeds of the rapidly rotating cutter 6 and slowly rotating rolls 8 and 9 can be readily established for a given set of conditions according to principles well known in the machining art. The higher speed of the rolls that is utilized during machining with the lathe-type cutting bits 98 can also be readily established by those skilled in the art.

Figure 7:
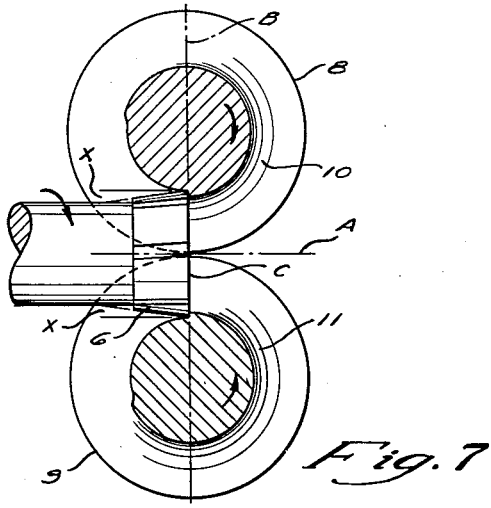
FIGURE 7 is a diagrammatic cross section showing the machining of the mill roll grooves according to the present invention.
Figure 8:
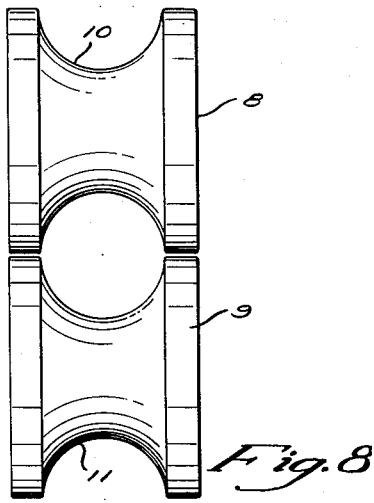
FIGURE 8 is a view of the mill roll showing the circular opening defined by the mill roll grooves after they have been machined in the manner illustrated in FIGURE 7.
Figure 9:
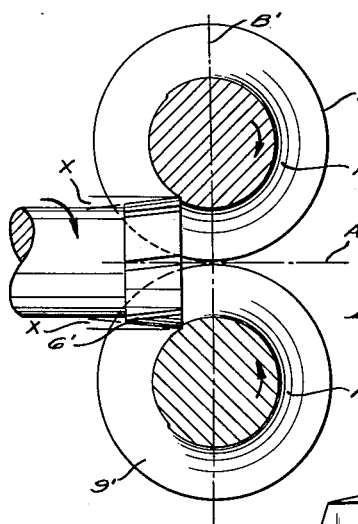
FIGURE 9 is a diagrammatic cross section showing a method of machining oval grooves in the mill rolls.
Figure 10:
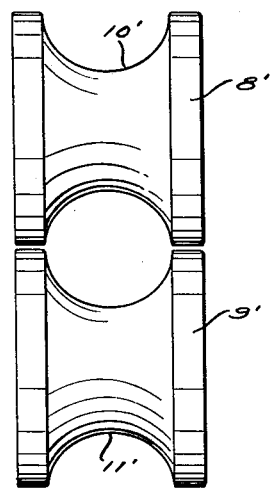
FIGURE 10 is an elevation showing the oval cross section of the opening defined by the mill roll grooves after they have been machined in the manner shown in FIGURE 9.

As shown in FIGURES 7 to 10 inclusive, by suitable choice of size of cutter 6, and suitable positioning of the cutter during the machining operation, it is possible in the illustrative apparatus to obtain a groove configuration in which the grooves 10 and 11 in the bite of the rolls 8 and 9 define substantially a perfect circle as shown in FIGURES 7 and 8, and a variety of configurations in which the grooves 10' and 11' in the rolls 8' and 9' define an oval configuration in the bite as shown in FIGURES 9 and 10.

More specifically, a circular configuration is produced when the rotating cutting tool is disposed with its axis A perpendicular to the plane B defined by the parallel axes of the cutting rolls 8 and 9, and front cutting edges C of the rotating cutter 6 are brought at least into such plane B.

The oval configuration arises when the circular rotating cutter 6' is disposed with its axis A' at right angles to the plane B' defined by the axes of the rolls 8' and 9', but the front cutting edges C' of the rotating cutter are offset rearwardly from the plane B' as shown in FIGURE 9. The amount of offset determines the degree or amount by which the configuration defined by the grooves varies from the true circle. As indicated above in the illustrated apparatus, the location of the front cutting edges of the cutter can be positively determined by a gage block 80 of proper length.

Thus, it is possible to achieve either a truly circular pass groove or one of flattened, oval configuration which is required in many cases, and the desired degree of flatness can be obtained readily. Moreover, the tool marks necessarily introduced by the machining operation extend transversely of the grooves or substantially axially of the rolls. These marks greatly increase the grip of the rolls on the work being passed between the rolls; furthermore, the character of the finish of the roll surfaces and the amount of roughening can be controlled in manners known to those skilled in the machining arts. In addition to the above advantages, the apparatus of the present invention greatly reduces the time required for machining the rolls; time savings up to 70% have been made because of the rapidity with which the apparatus can be set up, the fact that the rolls need not be removed from their mill housings, and the rapidity with which the machining operation can be carried out by the multiple bladed cutter without overheating or the necessity of the replacement of the cutter during a roll-machining operation. Moreover, the grooves are very accurately formed since they are machined when the rolls are in the relative positions they occupy during the rolling operation.

By the present invention, the time required to remount the mill rolls and to adjust them relatively to each other in a mill housing and to other rolls in a mill, is completely eliminated; in a 16 stand mill, for example, from six to eight hours are required simply to adjust rolls machined by conventional methods, without taking into account the time lost in removing the rolls for machining and replacing them after machining. Moreover, the extreme accuracy of the groove locations and shapes made possible by the present invention provide rapid, accurate lining up of the roll pass lines of the mill stands in a mill, and hence make possible great accuracy in the rolling operation and greatly improve the quality of the rolled work.

Furthermore, the very substantial time savings resulting from the invention reduce down time and hence make possible increased production out of a given investment in a mill, plant floor space, and inventory of spare rolls.

Various changes may be made in the method and apparatus described as illustrative of the invention. For example, while the invention has been described for convenience in connection with the milling of a pair of rolls having a single pair of matched grooves defining a single pass line, it is possible to use the invention in simultaneously machining a set of grooves in three or more rolls arranged in a roll housing to provide a single pass line, or arranged in stacked relation to provide two or more pass lines. Furthermore, the invention can, with slight modification, be employed for milling two or more sets of adjacent matching grooves in a pair of rolls, by utilizing a cutting head having a plurality of side-by-side rotating cutters; in such case by suitably locating the axial travel of the various cutters relatively to the rolls, it is also possible in a single pair of rolls to have a plurality of sets of grooves defining openings varying in cross sectional configuration, which is advantageous in certain types of mills. It is also possible according to the invention to machine cooperating mill roll grooves defining openings of other than circular or oval cross sectional shapes, by mounting the cutter with its axis of rotation non-coincident with the pass line of the work through the mill roll grooves.

Those skilled in the art will appreciate that these and other modifications may be made in the above described embodiment without departing from the spirit of the invention. It is therefore to be understood that my patent is not limited to the preferred form of the invention disclosed herein or in any other manner than by the scope of the appended claims.

I claim:

1. The method of cutting circumferential grooves, each of uniform cross section throughout its circumferential length, in a pair of mill rolls which in use rotate and work on a workpiece located on a pass line extending between a pair of matched circumferential grooves in said pair of rolls, which method comprises simultaneously positively rotating said mill rolls about axes having the same relative positions as when the mill rolls are used to work on the workpiece, rotating a generally circular cutter of the end mill type at machining speed about an axis essentially coincident with the location of said pass line relatively to said rolls, said mill rolls being completely rotated in opposite directions at a substantially lower angular speed than that of the cutter so that at a bite of said rolls the surfaces of both rolls travel toward the cutter, and causing relative movement between the cutter and the pair of rolls independently of the rotation of said rolls along said axis of rotation of the cutter so that the cutter engages the rolls and cuts therein matched circumferential grooves of uniform cross section as the cutter rotates and both rolls completely rotate.

2. The method of cutting circumferential grooves, each of uniform cross section throughout its circumferential length, in a pair of mill rolls which in use are rotatably supported in a mill housing frame to rotate and work on a workpiece passing between a pair of matched circumferential grooves in said pair of rolls, which method comprises simultaneously positively rotating the mill rolls while they are rotatably supported in said mill housing frame about the axes in said frame about which they rotate when working on the workpiece, said rolls being completely rotated in opposite directions so that at a bite of said rolls the surfaces of both said rolls travel toward said bite, rotating a generally circular milling cutter of the end mill type about an axis transverse to the axes of said rolls while said cutter is on the same side of said rolls as said bite, and causing relative movement between the cutter and the pair of said rolls independently of the rotation of said rolls along said axis of rotation of the cutter so that the cutter engages the rolls and cuts therein circumferential grooves of uniform cross section therein as the cutter rotates and both rolls simultaneously rotate.

3. The method of cutting circumferential grooves, each of uniform cross section throughout its circumferential length, in a pair of mill rolls which in use are rotatably supported in a mill housing frame to rotate and work on a workpiece passing between a pair of matched circumferential grooves in said pair of rolls, which method comprises simultaneously positively rotating the mill rolls while they are rotatably supported in said mill housing frame about the axes in said frame about which they rotate when working on the workpiece, said rolls being completely rotated in opposite directions so that at a bite of said rolls the surfaces of both said rolls travel toward said bite, rotating a generally circular milling cutter of the end mill type about an axis transverse to the axes of said rolls while said cutter is on the same side of said rolls as said bite, and causing relative movement between the cutter and the pair of said rolls independently of the rotation of said rolls along said axis of rotation of the cutter so that the cutter engages the rolls and cuts therein matched circumferential grooves of uniform cross section as the cutter rotates and both rolls completely rotate, and applying a braking force preventing angular oscillation of said rolls while said cutter is in cutting engagement therewith and said cutter and rolls move relatively toward each other.

4. The method of cutting circumferential grooves, each of uniform cross section throughout its circumferential length, in a pair of mill rolls which in use are rotatably supported in a mill housing frame to rotate about axes lying in a plane and work on a workpiece located along a pass line that is perpendicular to said plane and passes between a pair of matched circumferental grooves in said pair of rolls, which method comprises rotating a generally circular milling cutter of the end mill type at machining speed about an axis essentially coincident with said pass line, simultaneously positively rotating the mill rolls, while they are rotatably supported in said mill housing frame about the axes in said frame about which they rotate when working on the workpiece, said rolls being completely rotated in opposite directions at a substantially lower angular speed than the cutter so that at a bite of said rolls the surfaces of both rolls travel toward said cutter, and causing relative movement between the cutter and the pair of rolls independently of the rotation of said rolls along said axis of rotation of said cutter so that the cutter engages the rolls and cuts therein matched circumferential grooves of uniform cross section as the cutter rotates and both rolls completely rotate, such movement between the cutter and mill rolls being continued only until the end cutting edges of said cutter reach a predetermined position short of the plane containing the axes of the mill rolls, whereby the matched grooves cut in the mill rolls define an opening of generally oval cross-sectional configuration.

5. Apparatus for cutting circumferential grooves, each of uniform cross section throughout its circumferential length, in a pair of mill rolls which in use are rotatably supported in a mill housing frame to rotate and work on a workpiece passing between a pair of circumferential grooves in said pair of rolls, said apparatus comprising a rotatable spindle adapted to support a milling cutter of the end mill type for rotation about the axis of rotation of said spindle; means for positively rotating said spindle; means for supporting a mill housing frame containing a set of mill rolls rotatably mounted in said frame about the axes in said frame about which said rolls rotate when working on the workpiece, said frame being supported so that said axes of said rolls are located in a predetermined relationship to the axis of rotation of said spindle; means for causing relative movement between said spindle and said rolls in said frame, independently of the rotation of said rolls, so that a milling cutter of the end mill type mounted on said spindle may be moved into and retracted from cutting engagement with said rolls to cut circumferential grooves of desired uniform cross sections and locations in said rolls; and means for simultaneously positively completely rotating said rolls in opposite directions so that at a bite of said rolls the surfaces of said rolls travel toward said cutter mounted on said spindle.

6. Apparatus for cutting circumferential grooves, each of uniform cross section throughout its circumferential length, in a pair of mill rolls which in use are rotatably supported in a mill housing frame to rotate and work on a workpiece passing between a pair of circumferential grooves in said pair of rolls, said apparatus comprising a rotatable spindle adapted to support a milling cutter of the end mill type for rotation about the axis of rotation of said spindle; means for positively rotating said spindle; means for supporting a mill housing frame containing a set of mill rolls rotatably mounted in said frame about the axes in said frame about which said rolls rotate when working on the workpiece, said frame being supported so that said axes of said rolls are located in a predetermined relationship to the axis of rotation of said spindle; means for causing relative movement between said spindle and said rolls in said frame, independently of the rotation of said rolls, so that a milling cutter of the end mill type mounted on said spindle may be moved into and retracted from cutting engagement with said rolls to cut circumferential grooves of desired uniform cross sections and locations in said rolls; means for simultaneously positively completely rotating said rolls in opposite directions so that at a bite of said rolls the surfaces of said rolls travel toward said cutter mounted on said spindle; and means braking the rotation of said rolls to prevent angular oscillations while said cutter is in cutting engagement with the rolls and there is relative movement of the cutter toward said rolls.

7. Apparatus for cutting circumferential grooves, each of uniform cross section throughout its circumferential length, in a pair of mill rolls which in use are rotatably supported in a mill housing frame to rotate and work on a workpiece passing between a pair of circumferential grooves in said pair of rolls, said apparatus comprising a rotatable spindle adapted to support a milling cutter of the end mill type for rotation about the axis of rotation of said spindle; means for positively rotating said spindle; means for supporting a mill housing frame containing a set of mill rolls rotatably mounted in said frame about the axes in said frame about which said rolls rotate when working on the workpiece, said frame being supported so that said axes of said rolls are located in a predetermined relationship to the axis of rotation of said spindle; means for causing relative movement between said spindle and said rolls, independently of the rotation of said rolls, so that a milling cutter of the end mill type mounted on said spindle may be moved into and retracted from cutting engagement with said rolls to cut circumferential grooves of desired uniform cross sections and locations in said rolls; means for simultaneously positively completely rotating said rolls in opposite directions so that at a bite of said rolls the surfaces of said rolls travel toward said cutter mounted on said spindle; and means for exerting an axially directed force on each of said rolls preventing axial movement thereof during cutting engagement of the cutter.

8. Apparatus for cutting circumferential grooves, each of uniform cross section throughout its circumferential length, in a pair of mill rolls which in use are rotatably supported in a mill housing frame to rotate and work on a workpiece located passing between a pair of circumferential grooves in said pair of rolls, said apparatus comprising a rotatable spindle one end of which is adapted to support a milling cutter of the end mill type for rotation about the axis of rotation of said spindle; means for positively rotating said spindle; means for supporting a mill housing frame containing a set of mill rolls rotatably mounted in said frame about the axes in said frame in which said rolls rotate when working on the workpiece, said frame being supported so that said axes of said rolls are located in a predetermined relationship to the axis of rotation of said spindle; means for causing relative movement between said spindle and said rolls in said frame, independently of the rotation of said rolls, so that a milling cutter of the end mill type mounted on said spindle may be moved into and retracted from cutting engagement with said rolls to cut circumferential grooves of desired uniform cross sections and locations in said rolls, means for simultaneously positively completely rotating said rolls in opposite directions so that at a bite of said rolls the surfaces of said rolls travel toward said cutter mounted on said spindle; means braking the rotation of said rolls to prevent angular oscillations thereof while said cutter is in cutting engagement with the rolls and there is relative movement of the cutter toward the rolls; and means exerting an axially directed force on each of said rolls preventing axial movement thereof during cutting engagement of said cutter.

9. Apparatus for cutting matched circumferential grooves, each of uniform cross section throughout its circumferential length, in a pair of mill rolls which in use are rotatably supported in a mill housing frame to rotate and work on a workpiece located along a pass line passing between a pair of matched circumferential grooves in said pair of rolls, said apparatus comprising a rotatable spindle adapted to support a milling cutter of the end mill type for rotation about the axis of rotation of said spindle; means for positively rotating said spindle; means for supporting the mill housing frame containing a set of mill rolls rotatably mounted in said frame about the axes in said frame about which said rolls rotate when working on the workpiece, said frame being supported so that the location of said pass line relative to said frame is essentially coincident with the axis of rotation of said spindle; means for causing relative movement between said spindle and said rolls in said frame along the axis of rotation of said spindle, said movement being independent of the rotation of said rolls, so that a milling cutter of the end mill type mounted on said spindle may be moved into and retracted from cutting engagement with said rolls to cut matched circumferential grooves of desired uniform cross sections and locations in said rolls; and means for simultaneously positively rotating said rolls in opposite directions so that at a bite of said rolls the surfaces of said rolls travel toward said cutter mounted on said spindle.

10. The apparatus of claim 9 which comprises means for automatically rapidly moving said spindle along its axis until a milling cutter thereon reaches a predetermined location adjacent to but spaced from said rolls mounted in said frame, and then halting axial movement of said spindle; and means for moving said spindle axially toward said rolls at a lower speed providing cutting engagement of said milling cutter.

11. The apparatus of claim 9 comprising means for demountably connecting said rolls to the means for positively rotating said rolls, means for adjusting the speed of rotation of said rolls, and means for adjusting the speed of rotation of said spindle.

References Cited in the file of this patent

UNITED STATES PATENTS

| | | |
|---|---|---|
| 832,304 | Farrington | Oct. 2, 1906 |
| 1,705,893 | Barnhardt | Mar. 19, 1929 |
| 2,428,301 | Surerus | Sept. 30, 1947 |
| 2,603,131 | Muller | July 15, 1952 |

FOREIGN PATENTS

| | | |
|---|---|---|
| 18,167 | Great Britain | of 1888 |
| 25,530 | Great Britain | of 1907 |